(12) United States Patent
Grothmann et al.

(10) Patent No.: US 9,235,800 B2
(45) Date of Patent: Jan. 12, 2016

(54) METHOD FOR THE COMPUTER-AIDED LEARNING OF A RECURRENT NEURAL NETWORK FOR MODELING A DYNAMIC SYSTEM

(75) Inventors: Ralph Grothmann, München (DE); Christoph Tietz, Ottobrunn (DE); Hans-Georg Zimmermann, Starnberg/Percha (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 412 days.

(21) Appl. No.: 13/640,543

(22) PCT Filed: Apr. 12, 2011

(86) PCT No.: PCT/EP2011/055664
§ 371 (c)(1),
(2), (4) Date: Dec. 12, 2012

(87) PCT Pub. No.: WO2011/128313
PCT Pub. Date: Oct. 20, 2011

(65) Prior Publication Data
US 2013/0204815 A1    Aug. 8, 2013

(30) Foreign Application Priority Data
Apr. 14, 2010    (DE) .......................... 10 2010 014 906

(51) Int. Cl.
*G06N 3/08*    (2006.01)
(52) U.S. Cl.
CPC ..................................... *G06N 3/08* (2013.01)

(58) Field of Classification Search
None
See application file for complete search history.

(56) References Cited

U.S. PATENT DOCUMENTS 7,464,061 B2 * 12/2008 Grothmann et al. ............ 706/15
7,953,683 B2 *  5/2011 Minamino et al. .............. 706/25

FOREIGN PATENT DOCUMENTS

DE    102008014126 A1    10/2009

OTHER PUBLICATIONS

Caglayan Erdem, Hans Georg Zimmermann, "Segmental Duration Control With Asymmetric Causal and Retro-Causal Neural Networks", proceedings Fourth ISCA (TRW on Speech Synthesis (SSW-4)), Perthshire, Scotland, Sep. 1, 2001, pp. 1-6.*

(Continued)

*Primary Examiner* — Kakali Chaki
*Assistant Examiner* — Walter Hanchak

(57) ABSTRACT

A method for the computer-aided learning of a recurrent neural network for modeling a dynamic system which is characterized at respective times by an observable vector with one or more observables as entries is provided. The neural network includes both a causal network with a flow of information that is directed forwards in time and a retro-causal network with a flow of information which is directed backwards in time. The states of the dynamic system are characterized by first state vectors in the causal network and by second state vectors in the retro-causal network, wherein the state vectors each contain observables for the dynamic system and also hidden states of the dynamic system. Both networks are linked to one another by a combination of the observables from the relevant first and second state vectors and are learned on the basis of training date including known observables vectors.

15 Claims, 11 Drawing Sheets

(56) References Cited

OTHER PUBLICATIONS

Achim F. Muller, Hans Georg Zimmermann, "Symbolic Prosody Modeling by Causal Retro-causal NNs with Variable Context Length", ICANN '01 Proceedings of the International Conference on Artificial Neural Networks, 2001, pp. 57-64.*

T. G. Barbounis and J. B. Theocharis, "Locally Recurrent Neural Networks for Wind Speed Predictions Using Spatial Correlation", Information Sciences, vol. 177, 2007, pp. 5775-5797.*

Jovina Roman and Akhtar Jameel, "Backpropagation and Recurrent Neural Netowks in Financial Analysis of Multiple Stock Returns", Proceedings of the 29th Annual Hawaii International Conference on System Sciences, 1996, pp. 454-460.*

Dreyfus, G.: Neural Networks: Methodology and Applications, Springer-Verlag, 2005. In the Internet: http://www.springerlink.com/content/978-3-540-22980-3/contents/ or Http://lab.fs.uni-lj.si/lasin/www/teaching/neural/doc/Dreyfus2005.pdf, found on Oct. 21, 2010; Others.

NeuroSolutions: NeuroSolutions Product Summary, Web-Archive Version: In the Internet on May 29, 2008: http://web.archive.org/web/20080529145212/http://www.neurosolutions.com/products/ns/features.html; Others.

Mike Schuster et al., "Bidirectional Recurent Neural Networks" in: IEEE Transactions on Signal Processing, IEEE Service Center, New York, NY, US, vol. 45, No. 11, Nov. 1, 1997, pp. 2673-2681; Magazine.

Achim F. Müller, Hans Georg Zimmermann, "Symbolic Prosody Modeling by Causal Retro-causal NNs with Variable Context Length", in: Artificial Neural Networks—ICANN 2001, Jan. 1, 2001, Springer Verlag, pp. 57-64; Book.

Baldi P. et al., "A Machine Learning Strategy for Protein Analysis", in: IEEE Intelligent Systems, IEEE, US, vol. 17, No. 2, Mar. 1, 2002, pp. 28-35; Magazine.

Zimmermann H.-G. et al., "Dynamical Consistent Recurrent Neural Networks", Neural Networks, 2005. Proceedings, 2005. IEEE International Joint Conference on Montreal, Que., Canada, Jul. 31-Aug. 4, 2005, Piscataway, NJ, USA, IEEE, US, vol. 3, Jul. 31, 2005, pp. 1537-1541; Magazine.

Caglayan Erdem, Hans-Georg Zimmermann: "SEgmental Duration Control With Asymmetric Causal Retro-Causal Neural Networks", http://www.isca-speech.org/archive, Aug. 21, 2001, found on the Internet an Jul. 6, 2011 URL:http://www.isca-speech.org/archive_open/archive_papers/ssw4/ssw4_119.pdf; Others.

* cited by examiner

METHOD FOR THE COMPUTER-AIDED LEARNING OF A RECURRENT NEURAL NETWORK FOR MODELING A DYNAMIC SYSTEM

CROSS REFERENCE TO RELATED APPLICATIONS

This application is the US National Stage of International Application No. PCT/EP2011/055664 filed Apr. 12, 2011, and claims the benefit thereof. The International Application claims the benefits of German Application No. 10 2010 014 906.3 DE filed Apr. 14, 2010. All of the applications are incorporated by reference herein in their entirety.

FIELD OF INVENTION

The invention relates to a method for computer-aided learning of a recurrent neural network for modeling a dynamic system and to a method for predicting the observables of a dynamic system on the basis of a learned recurrent neural network, and to a corresponding computer program product.

BACKGROUND OF INVENTION

Recurrent neural networks are used nowadays in various fields of application as an appropriate way of modeling the changes over time of a dynamic system such that a recurrent neural network learned using training data of the dynamic system can accurately predict the observables (observable states) of the system in question. Said recurrent neural network is also used to model, as states of the dynamic system, not only the observables but also unknown hidden states of the dynamic system, wherein generally only a causal information flow, i.e. proceeding forward in time, between consecutive states is considered. However, dynamic systems are often based on the principle that future predictions concerning observables also play a role in the changes over time of the states of the system. Such dynamic systems are often only inadequately described by known recurrent neural networks.

SUMMARY OF INVENTION

An object is to create a method for computer-aided learning of a recurrent neural network that will provide better modeling of dynamic systems.

This object is achieved by the independent claims. Developments of the invention are defined in the dependent claims.

The method according to the invention is used for computer-aided learning of a recurrent neural network for modeling a dynamic system which is characterized at respective points in time by an observable vector comprising one or more observables (i.e. observable states of the dynamic system) as entries. This method can be applied to any dynamic systems. It can be used, for example, to model energy price and/or commodity price movements. The method likewise enables any technical system that changes dynamically over time to be modeled on the basis of corresponding observable state variables of the technical system in order thereby to predict observables of the technical system using an appropriately learned network. For example, the method can be usefully employed to model a gas turbine and/or a wind turbine.

The recurrent neural network in the method according to the invention comprises a first subnetwork in the form of a causal network which describes an information flow proceeding forward in time between first state vectors of the dynamic system, wherein a first state vector at a respective point in time comprises one or more first entries which are each assigned to an entry of the observable vector, as well a one or more hidden (i.e. unobservable) states of the dynamic system. In order also to take future changes over time of the dynamic system into account in the recurrent neural network, a second subnetwork in the form of a retro-causal network is provided, wherein the retro-causal network describes an information flow proceeding backward in time between second state vectors of the dynamic system, wherein a second state vector at a respective point in time comprises one or more second entries which are each assigned to an entry of the observable vector, as well as one or more hidden states of the dynamic system. In the recurrent neural network, the observable vector at a respective point in time is determined such that the first entries of the first state vector are combined with the second entries of the second state vector. Finally, the causal and the retro-causal network are learned based on training data containing a sequence of consecutive known observable vectors.

The method according to the invention is characterized in that a dynamic system is described by a recurrent neural network which takes into account both an information flow from the past to the future and an information flow from the future to the past. This enables dynamic systems to be suitably modeled in which the observables at a respective point in time are also influenced by predicted future observable values.

In a particularly preferred embodiment, during learning of the causal and retro-causal network at a respective point in time for which a known observable vector from the training data exists, the first and second entries of the first and second state vectors are corrected using the difference between the observable vector determined in the recurrent neural network and the known observable vector at the respective point in time. The first and second state vectors with the corrected first and second entries then continue to be used for learning. In this way, at a respective point in time so-called teacher forcing is achieved whereby observables determined in the recurrent neural network are always matched to observables according to the training data.

In another particularly preferred embodiment, the causal and retro-causal networks are learned based on error-backpropagation with shared weights. This method of error-backpropagation with shared weights will be sufficiently familiar to the average person skilled in the art and is frequently used for learning in recurrent neural networks. By using this method, simple and efficient learning of the recurrent neural network is achieved.

In another preferred embodiment of the method according to the invention, in the recurrent neural network the observable vector is determined at a respective point in time such that the respective first and second entries which are assigned to the same entry of the observable vector are added.

In another embodiment of the method according to the invention, during learning of the causal and retro-causal network a target value is determined at a respective point in time for which a known observable vector according to the training data exists, which target value constitutes the difference vector between the observable vector determined in the recurrent neural network and the known observable vector at the respective point in time. Predefined here as the learning optimization target is the minimization of the sum of the absolute values or squared absolute values of the difference vectors at the respective points in time for which a known observable vector from the training data exists. This provides a simple means of ensuring that the recurrent neural network correctly models the dynamics of the system in question.

In another embodiment of the method according to the invention, in the causal network a first state vector at a respective point in time is converted to a first state vector at a subsequent point in time by multiplication by a matrix assigned to the causal network and application of an activation function. In a particularly preferred variant, first the activation function is applied to the state vector at the respective point in time and only subsequently is multiplication by the matrix assigned to the causal network performed. This ensures that observables can be described which are not limited by the value range of the activation function.

In another embodiment of the method according to the invention, in the retro-causal network a second state vector at a respective point in time is converted into a second state vector at a previous point in time by multiplication by a matrix assigned to the retro-causal network and application of an activation function. Once again, first the activation function is preferably applied to the second state vector at the respective point in time and only subsequently is multiplication by the matrix assigned to the retro-causal network performed. This ensures also for the retro-causal network that observables can be described which are not limited by the value range of the activation function.

In a particularly preferred variant, the above described activation functions are tan h (hyperbolic tangent) functions which are frequently used in recurrent neural networks.

In addition to the method described above, the invention comprises a method for predicting observables of a dynamic system whereby the prediction is carried out using a recurrent neural network which is learned using the inventive learning process based on training data comprising known observable vectors of the dynamic system.

The invention additionally relates to a computer program product having program code stored on a machine-readable medium for carrying out the methods described above when the program is run on a computer.

BRIEF DESCRIPTION OF THE DRAWINGS

Exemplary embodiments of the invention will now be described in detail with reference to the accompanying drawings in which.

DETAILED DESCRIPTION OF INVENTION

Recurrent neural networks for modeling the behavior over time of a dynamic system are sufficiently known from the prior art. These networks generally comprise a plurality of layers which generally contain a plurality of neurons and can be suitably learned based on training data from known states of the dynamic system such that future states of the dynamic system can be predicted.

Figure 1:
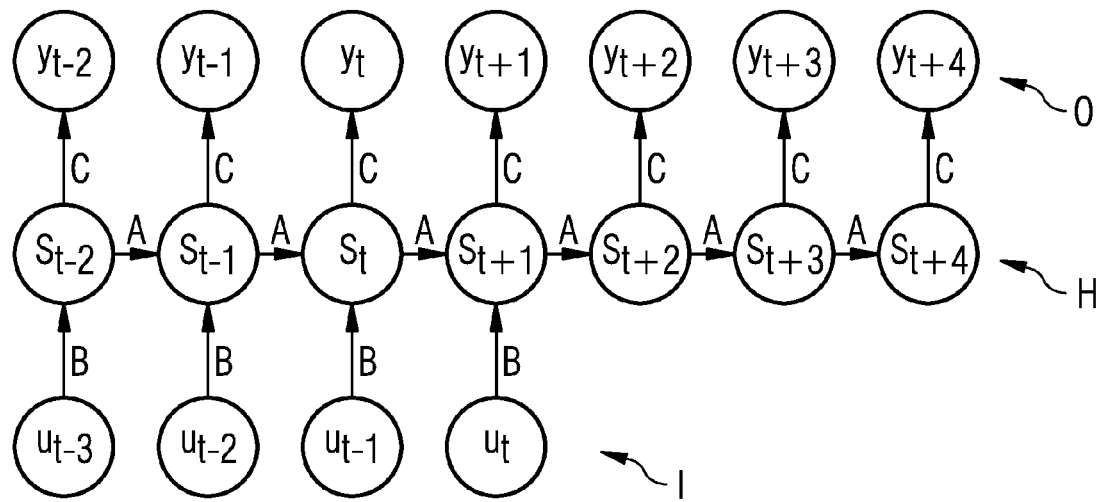
FIG. 1 and FIG. 2 show two variants of known recurrent neural networks for modeling a dynamic system.

FIG. 1 shows a known prior art variant of a neural network which models an open dynamic system. This network comprises an input layer I having consecutive state vectors $u_{t-3}$, $u_{t-2}$, $u_{t-1}$ and $u_t$ which represent corresponding input variables of the dynamic system. These input variables can be, for example, manipulated variables of a technical system modeled using the neural network. The individual state vectors of the input layer I are connected to corresponding hidden state vectors $s_{t-2}$, $s_{t-1}$, etc. of a hidden layer via matrices B. The hidden state vectors comprise a plurality of hidden states of the dynamic system and constitute the (unobservable) state space of the dynamic system. The individual hidden state vectors are interconnected via matrices A. The network additionally comprises an output layer 0 having output variables in the form of state vectors $y_{t-2}, y_{t-1}, \ldots, y_{t+4}$ which are linked to corresponding hidden state vectors $s_{t-2}, s_{t-1}, \ldots, s_{t+4}$ via the matrix C. The states of the output layer are states of the dynamic system which result from the corresponding input variables of the input layer I. Based on training data which consists of known input variables and resulting known output variables, the neural network in FIG. 1 can be suitably learned using known methods such as error-back-propagation and then used to predict future output variables $y_{t+1}, y_{t+2}$, etc. in the output layer 0 on the basis of past input variables $u_{t-3}, u_{t-2}, \ldots, u_{t-t}$ and the present input variable $u_t$ in the input layer I. The network in FIG. 1 is based on modeling of the dynamic system in question in the form of a superposition of an autonomous and of an externally driven subsystem.

Figure 2:
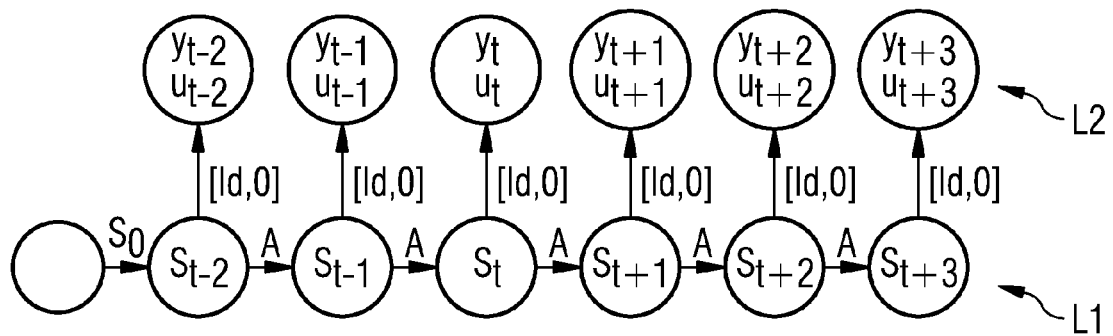

FIG. 2 shows another variant of a recurrent neural network which is used in the embodiments described below of the method according to the invention. This network models a closed dynamic system and differs from the network in FIG. 1 in that a distinction is no longer made between input variables $u_\tau$ and output variables $y_\tau$, where $\tau$ hereinafter denotes any point in time. Rather, both the input variables and the output variables are considered as observables, i.e. observable states of an observable vector of the dynamic system. The network in FIG. 2 comprises a first layer L1 and a second layer L2, wherein the first layer L1 represents an information flow proceeding forward in time between individual state vectors $s_{t-2}, s_{t-1}, \ldots, s_{t+3}$ of the modeled dynamic system. In contrast to FIG. 1, in the embodiment in FIG. 2 a state vector $s_\tau$ initially contains as entries the observable observables corresponding to the state vectors $y_t$ and $u_t$ in FIG. 1, and then the unobservable hidden states, wherein the number of hidden states is generally much greater than the number of observables. The individual state vectors in the layer L1 are converted into one another by matrices A which are suitably learned based on training data. At the start of said learning, in the layer L1 a suitable bias is defined which is denoted by $S_0$ in FIG. 2 and also in all the subsequent figures.

A suitably learned recurrent neural network as shown in FIG. 2 supplies in the second layer the observables $y_{t-1}, u_{t-2}, y_{t-1}, u_{t-1}, \ldots$, etc. at the respective points in time. The entries of the corresponding state vectors $s_\tau$, which entries correspond to observables, are obtained via the matrix [Id, 0]. For the columns, the matrix [Id, 0] has the dimension of the state vector $s_\tau$ and, for the rows, the dimension according to the number of observables. The left-hand part of the matrix forms a square identity matrix and, for the remaining columns, the matrix contains only zeros by means of which the filtering of the observables from the state vector $s_\tau$ is achieved. With the network in FIG. 2, the observables are embedded in a large state vector $s_\tau$, thereby achieving dynamically consistent dynamic system modeling that is symmetrical in all the variables, wherein time plays no specific role. The network in FIG. 2 also represents a causal network, as the information flow between the states of the layer L1 progresses forward in time from the past to the future.

Figure 3:
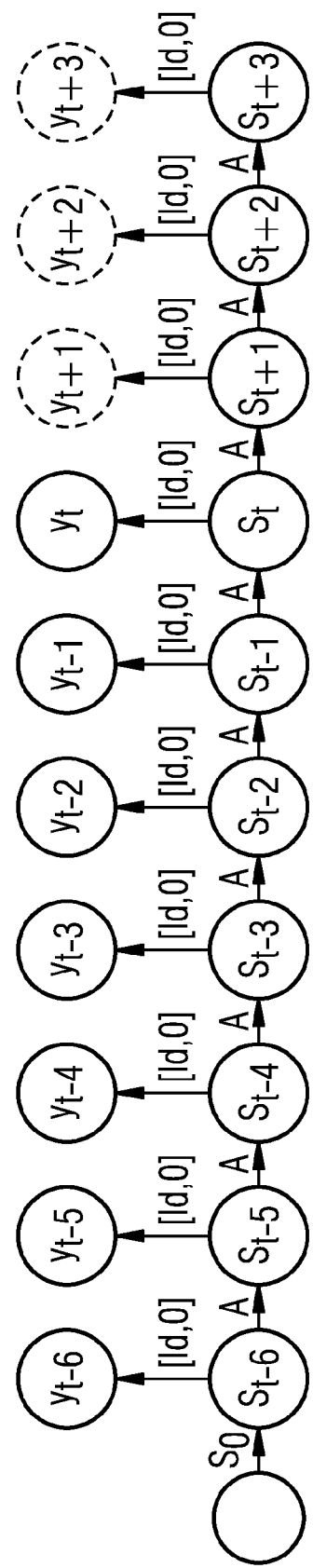
FIG. 3 shows a variant of a recurrent neural network based on FIG. 2 which is inventively used as a causal subnetwork.

FIG. 3 shows a recurrent neural network based on FIG. 2, wherein now all the observables are consistently denoted as observable vectors $y_{t-6}$, $y_{t-5}$, ..., $y_{t+3}$. The notation $y_\tau$ therefore comprises both the output variable $y_\tau$ and the input variable $u_\tau$ from FIG. 2. This notation will also be used in the following for all the other recurrent neural network variants described. In addition, in FIG. 3 the observable vectors $y_{t+1}$, $y_{t+2}$, and $y_{t+3}$ to be predicted using the network are indicated by dashed circles for the sake of clarity, i.e. the present point in time is denoted by t in FIG. 3 and also in all the other figures. Past points in time are therefore the time instants t−1, t−2, etc. and future points in time are the time instants t+1, t+2, t+3, etc.

Figure 4:
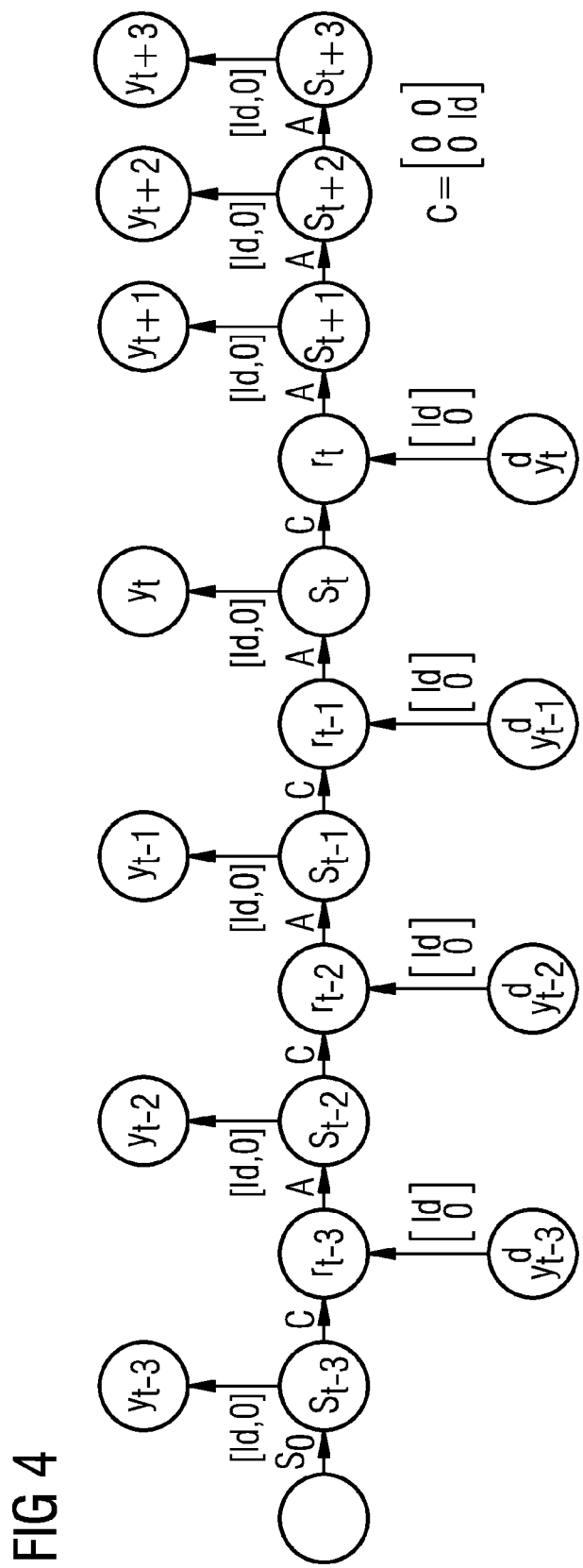
FIG. 4 shows a variant known from the prior art for learning the causal network according to FIG. 3.

FIG. 4 shows a known variant of the learning of the recurrent neural network in FIG. 3, where $y^d_{t-3}$, $y^d_{t-2}$, $y^d_{t-1}$ and $y^d_t$ represent known observable vectors according to predefined training data of the dynamic system to be modeled. The matrix [Id, 0] corresponds to the above explained matrix for filtering the observables from the corresponding state vector $s_\tau$. On the other hand, the matrix $$\begin{bmatrix} Id \\ 0 \end{bmatrix}$$

enables the known observable vector $y^d_t$ to be converted into an observable vector which contains not only the entries for the known observables but also entries for the other hidden states which, however, are all set to zero. This matrix $$\begin{bmatrix} Id \\ 0 \end{bmatrix}$$

comprises a number of columns corresponding to the number of observables and a number of rows corresponding to the dimension of the state vector $s_\tau$. In the upper portion, the matrix forms a square identity matrix and the remaining rows of the matrix contain exclusively zeros. The network in FIG. 4 additionally contains the matrix C with which a state $s_\tau$ is transitioned to a state $r_\tau$. Said state $r_\tau$ represents a filtered state which contains only the hidden states of the vector $s_\tau$. Consequently, the matrix C is a matrix which contains ones on the diagonal elements corresponding to the corresponding rows or columns of the hidden states and whose remaining entries are set to zero.

The linking shown in FIG. 4 of the known states $y^d_\tau$ with the state $r_\tau$ ensures that the observable values obtained by the neural network are replaced by the observables $y^d_\tau$ according to the training data. Replacement of the determined observables by the actual observables according to the training data is therefore achieved in each time step $\tau \le t$. Such a learning method is also known as "teacher forcing". According to the representation in FIG. 4, the following relationships are modeled using the recurrent neural network, wherein—as mentioned above—the time t corresponds to the current present time:

$$\tau \le t:\ s_{\tau+1} = \tanh\left(A\left(\begin{bmatrix} 0 & 0 \\ 0 & Id \end{bmatrix} s_\tau + \underbrace{\begin{bmatrix} Id \\ 0 \end{bmatrix} y^d_\tau}_{r_\tau}\right)\right) \quad (1)$$

$$\tau > t:\ s_{\tau+1} = \tanh(As_\tau) \quad (2)$$

$$\text{for all } \tau:\ y_\tau = [Id, 0]s_\tau. \quad (3)$$

The learning is based on the following optimization target:

$$\sum_{\tau=t-m}^{t} (y_\tau - y^d_\tau)^2 \to \min_A. \quad (4)$$

In other words, the matrix A is sought which minimizes the quadratic error, summed over the time instants $t-m \le \tau \le t$, between observable vectors determined via the network and known observable vectors.

Figure 5:
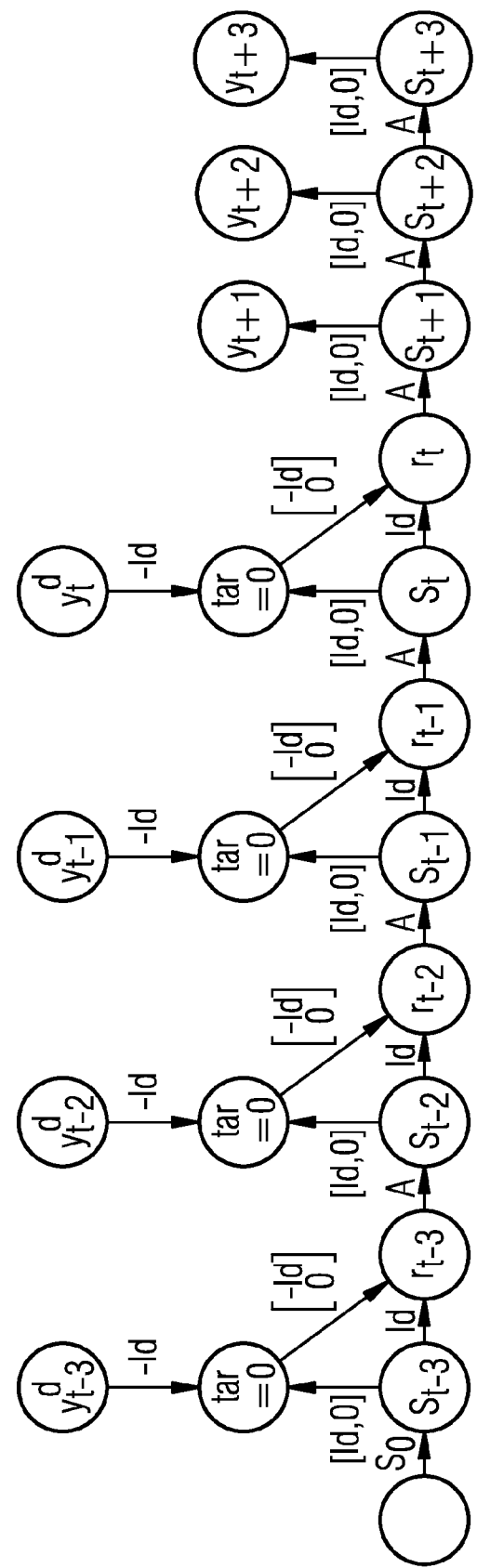
FIG. 5 and FIG. 6 show variants of the learning of the causal network from FIG. 3 which are used in embodiments of the method according to the invention.
Figure 6:
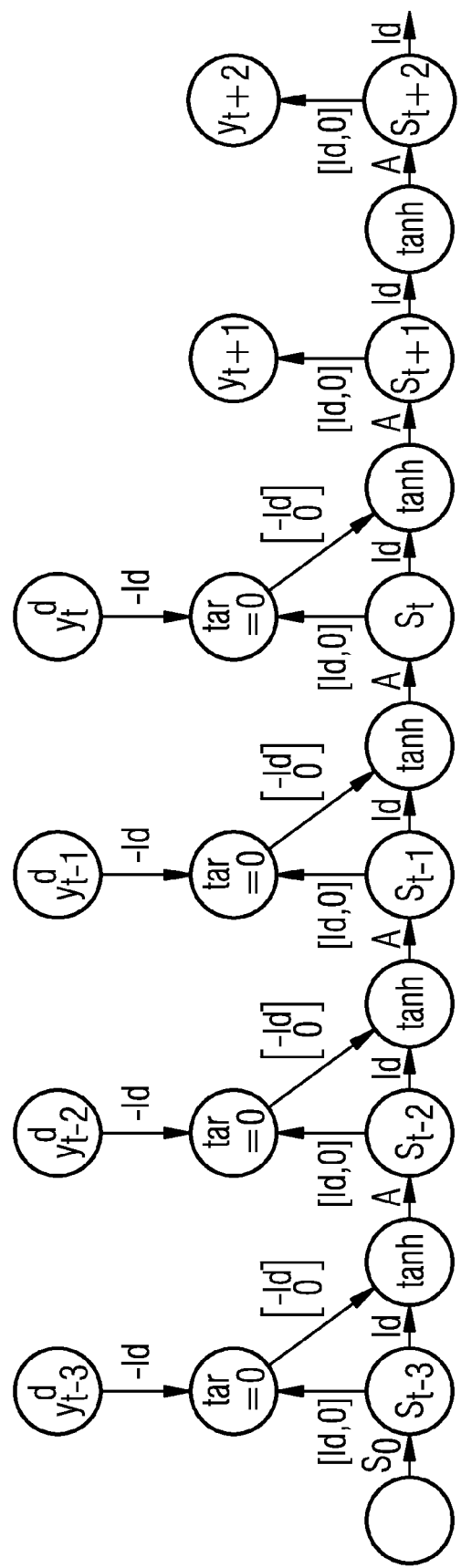

The teacher forcing described above is also employed in the recurrent neural network used in the method according to the invention, but in modified variants which are illustrated in FIGS. 5 and 6 for the causal network in FIG. 3. Similar notations to FIG. 4 are retained (except for any signs). The additional matrix Id in FIG. 5 denotes a corresponding identity mapping for the state vector at which the arrow denoted by the matrix begins. In contrast to the embodiment in FIG. 4, a target variable or target value tar is now introduced in FIG. 5 which represents the difference vector between the observable vector $y_\tau$ determined by the recurrent neural network within the state vector $s_\tau$ and the known observable vector $y^d_\tau$. This target value, which is ideally zero, is in turn used to replace the corresponding determined observables in the vectors $s_\tau$ by the known observables according to the training data, which is expressed by the linking via the matrix $$\begin{bmatrix} -Id \\ 0 \end{bmatrix}.$$

Using the structure of the network according to FIG. 5, the following equations are modeled:

$$\tau \le t:\ s_{\tau+1} = \tanh\left(A\underbrace{\left(s_\tau - \begin{bmatrix} Id \\ 0 \end{bmatrix}(y_\tau - y^d_\tau)\right)}_{r_\tau}\right) \quad (5)$$

$$\tau > t:\ s_{\tau+1} = \tanh(As_\tau) \quad (6)$$

$$\text{for all } \tau:\ y_\tau = [Id, 0]s_\tau. \quad (7)$$

Similarly to the network in FIG. 4, the optimization target is given by:

$$\sum_{\tau=t-m}^{t} (y_\tau - y^d_\tau)^2 \to \min_A. \quad (8)$$

Using the architecture according to FIG. 5, because of the tan h function used, only observables between −1 and +1 can be modeled, as matrix multiplication by the matrix A is performed first and only then is the tan h function applied which has a value range between −1 and 1. In a modified variant of the learning according to FIG. 5, the tan h function is applied to the corresponding state $r_\tau$ or $s_\tau$ first, and only then is matrix multiplication by the matrix A performed. Such a variant of the network is illustrated in FIG. 6, wherein the application of the tan h function before matrix multiplication by the matrix A is illustrated in that the tan h function is now depicted in the circles which in FIG. 5 contain the states $r_\tau$, and also between the states $s_{t+1}$ and $s_{t+2}$. According to this variant, observables outside the value range between −1 and +1 can also be modeled. FIG. 6 shows a preferred learning variant which is also used in the inventive neural network structure described below. The difference between the recurrent neural network in FIG. 6 and the recurrent neural network in FIG. 5 can be expressed mathematically in that, in the above equations (5) and (6), the position of the matrix A is transposed with the position of the function tan h.

In the preceding, suitable learning of a causal network having an information flow proceeding forward in time was described. The invention is based on the insight that a causal modal is not always suitable for describing a dynamic system. In particular, there are dynamic systems which also have a retrocausal information flow in the reverse time direction from the future to the present. These are dynamic systems whose changes over time are influenced by planning involving the prediction of future observables. For the change over time of a corresponding state vector of the dynamic system, not only preceding state vectors but also predicted future state vectors are therefore taken into account. For example, regarding the market price movements of energy or commodities, the price is determined not only by supply and demand, but also by planning aspects of the sellers/buyers for the sale/purchase of energy or commodities.

Figure 7:
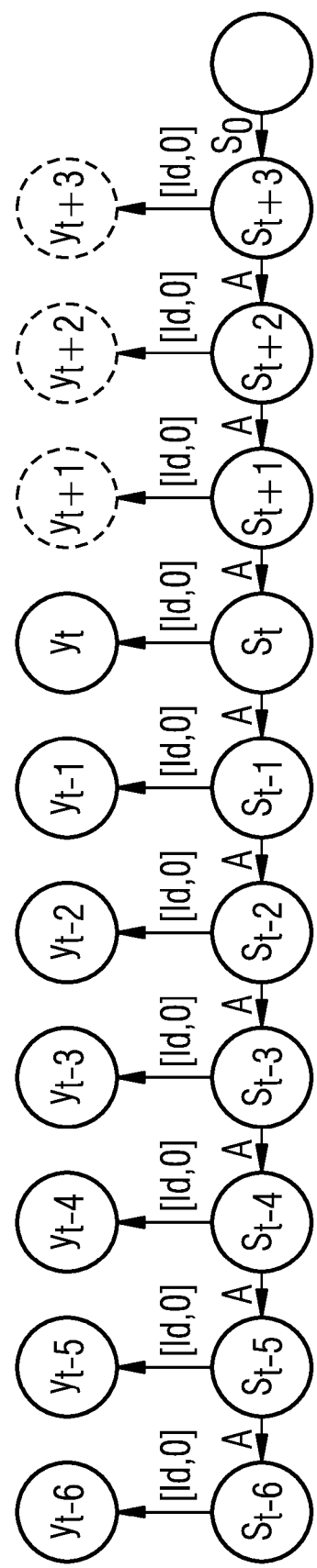
FIG. 7 shows a retro-causal network which is used in the method according to the invention in combination with the causal network from FIG. 3.
Figure 8:
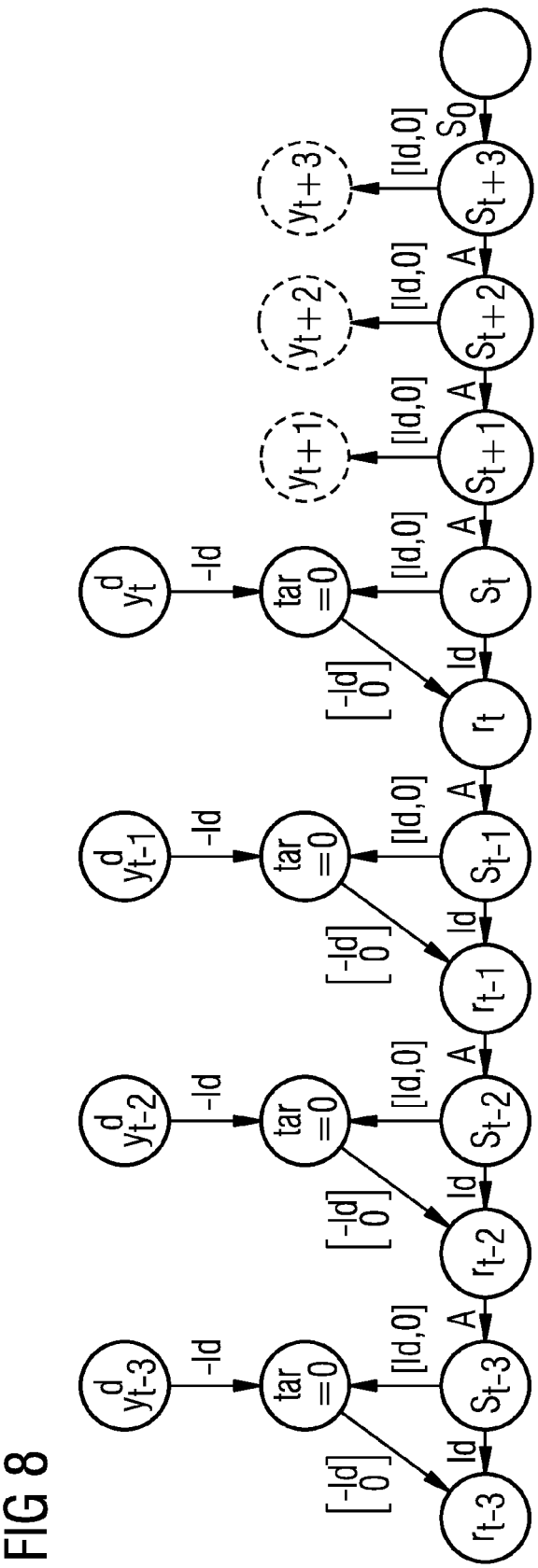
FIG. 8 and FIG. 9 show variants of the learning of the retro-causal network from FIG. 7 which are used in embodiments of the method according to the invention.
Figure 9:
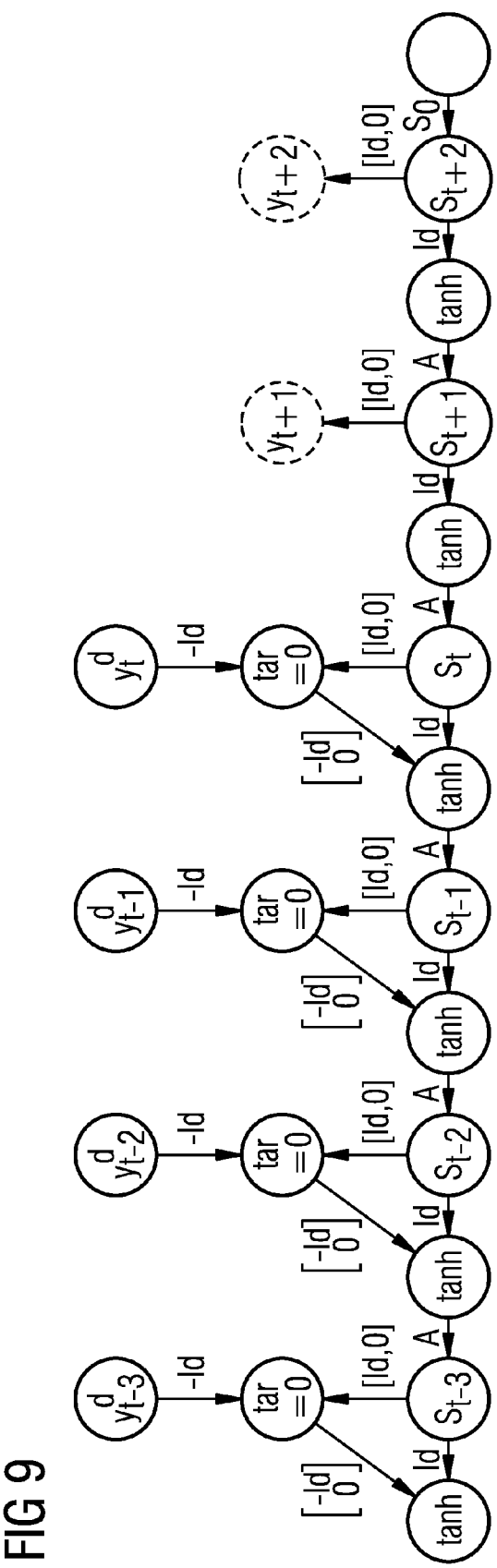

The method according to the invention is based on the concept of modeling a dynamic system such that an information flow is considered not only in the causal direction from the past to the future, but also an information flow in the retro-causal direction from the future to the past. Such an information flow can be implemented by a retro-causal network. Such a network is depicted in FIG. 7. The network in FIG. 7 differs from the network in FIG. 3 in that the information flow between the states $s_\tau$ runs in reverse direction from the future to the past, the process being again initialized using a bias $S_0$ which now, however, is a state in the future. Analogously to the network in FIG. 3, the network in FIG. 7 can be learned via the minimization of a target value tar, as indicated in FIG. 8. FIG. 8 corresponds to the representation in FIG. 5 except that the causality direction is now reversed. The equations (5) to (8) can be applied analogously, with the difference that $s_{\tau+1}$ is replaced by $s_{\tau-1}$ in equations (5) and (6). The above described teacher forcing for learning the network can therefore also be used for the retro-causal network. Likewise, the learning shown in FIG. 6, in which first the tan h function and only then matrix multiplication is applied at the transition from one state to a successor state, can also be used analogously for the retro-causal network. This is illustrated in FIG. 9 which corresponds to the representation in FIG. 6, with the difference that the information flow proceeds from the future to the present.

The invention is henceforward based on a combination of a causal network with a retro-causal network, thereby providing a recurrent neural network having an information flow both from the past to the future and from the future to the past. This makes it possible to also model dynamic systems in which predicted future states also play a role in the dynamic progression of the states.

Figure 10:
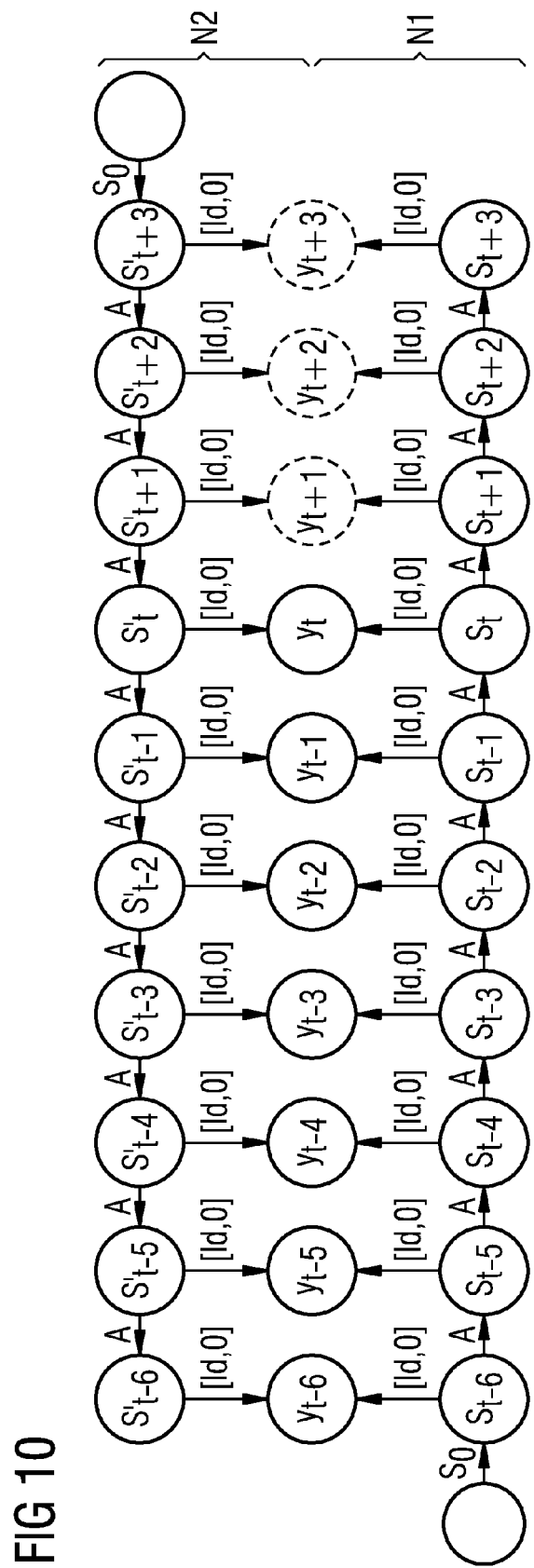
FIG. 10 shows an embodiment of an inventive recurrent neural network which combines the networks from FIG. 3 and FIG. 7 with one another.

FIG. 10 shows in generic form an inventive combination of a causal network with a retro-causal network, thereby creating a recurrent neural network which can be learned in a suitable manner. The lower part of this network is composed of a causal network N1 and the upper part is composed of a retro-causal network N2. The network N1 corresponds to the causal network in FIG. 3 and the network N2 corresponds to the retro-causal network in FIG. 7, wherein in the retro-causal network the matrices are now denoted by A' and the states by $s_\tau'$, since matrices and states for the causal and the retro-causal network can be different. The two networks are interlinked by the corresponding observable vector $y_\tau$.

Figure 11:
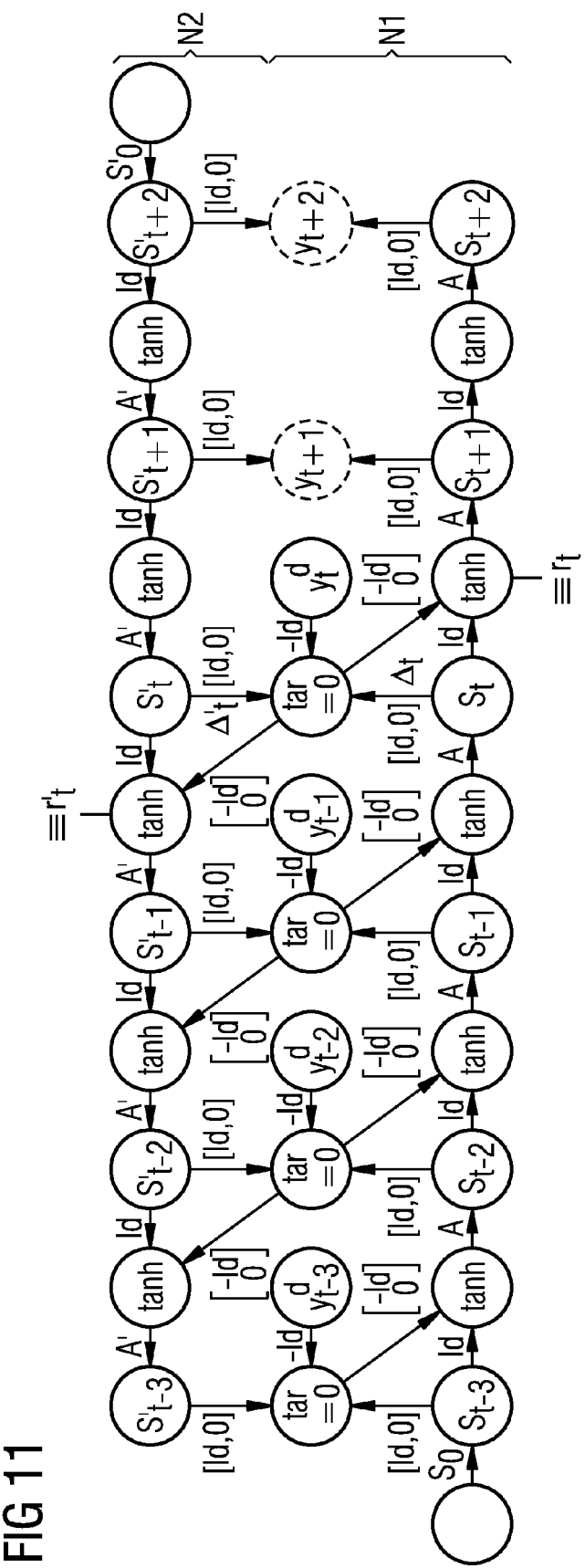
FIG. 11 and FIG. 12 show embodiments of the inventive learning of the recurrent neural network illustrated in FIG. 10.

Based on the network in FIG. 10, FIG. 11 shows the learning of the network by means of teacher forcing. In the preceding, said teacher forcing has been explained separately for the causal network in FIG. 6 and the retro-causal network in FIG. 9. In FIG. 11, for example, the observables contained in the state vector $s_t$ are denoted by $\Delta_t$ and the observables contained in the state vector $s_t'$ by $\Delta_t'$ for the time t. The sum of $\Delta_t$ and $\Delta_t'$ represents the observable vector determined by the recurrent network and the target value is the difference between this sum and the actual observable vector $y^d_t$ according to the training data. By linking the target values via the corresponding matrices $$\begin{bmatrix} -Id \\ 0 \end{bmatrix}$$

to the state vector $s_\tau$ or $s_\tau'$, teacher forcing is again achieved for each time step $\tau \le t$. In FIG. 11 the corresponding state $r_\tau$ or $r_\tau'$ resulting from teacher forcing is specified e.g. only for the time instant $\tau32$ t. To this state is then applied first the tan h function and then multiplication by the matrix A or A'.

Figure 12:
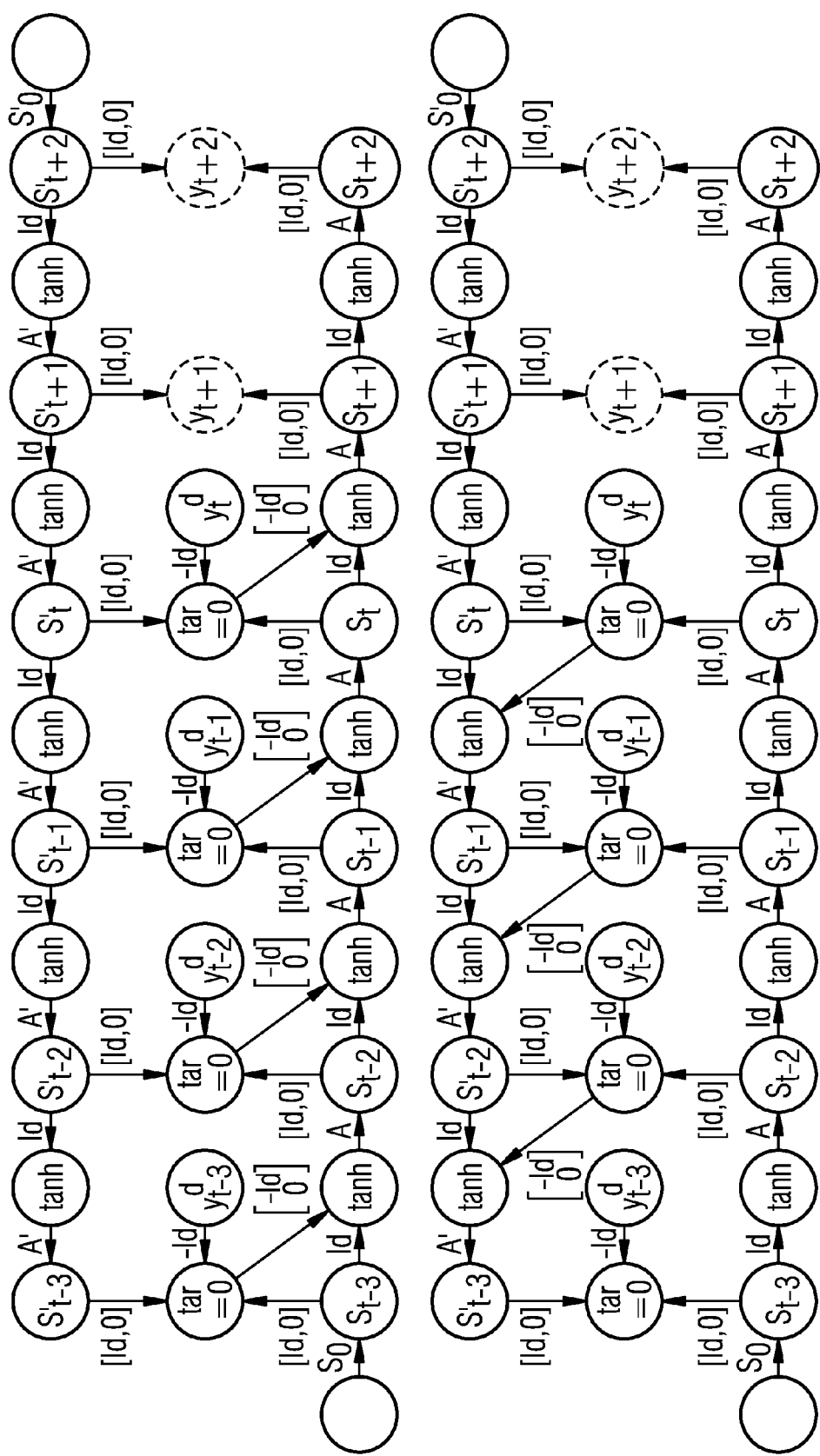

In order to implement learning according to FIG. 11, error-back-propagation with shared weights, a method sufficiently known from the prior art, is used as shown in FIG. 12. Error-back-propagation with shared weights is achieved in that error-back-propagation is calculated once for the causal network N1 and once for retro-causal network N2 in two copies of the network in FIG. 11, it being simultaneously ensured that the same matrix A is always used in both copies of the network and the same matrix A' is always used in both copies of the network. Error-back-propagation with shared weights is sufficiently well known to the average person skilled in the art and will not therefore be explained in further detail.

The inventive method described in the foregoing has a number of advantages. In particular, dynamic systems can also be learned in which future predicted states of the dynamic system influence the current state. The method can be used for different dynamic systems. For example, the dynamic system can represent the changes over time of energy or more specifically electricity prices and/or commodity prices, wherein various types of energy (e.g. gas, oil) and/or commodities as well as other economic factors such as the conversion of different currencies and share indices can be taken into account as observables. Using a recurrent neural network learned by appropriate training data, suitable predictions concerning future price movements for energy and/or commodities can be made. Another field of application is modeling the dynamic behavior of a technical system. For example, the recurrent neural network according to the invention can be used to predict the observable states of a gas turbine and/or of a wind turbine or also of any other technical systems.

The invention claimed is:

1. A method for computer-aided learning of a recurrent neural network for modeling a dynamic system which is characterized at respective times by an observable vector comprising one or more observables as entries, the method comprising:
provided a recurrent neural network comprising a causal network, a retro-causal network, an observable vector with one or more observables,
wherein the causal network describes an information flow proceeding forward in time between first state vectors of the dynamic system, wherein a first state vector at a respective point in time comprises one or more first entries which are each assigned to an entry of the observable vector, and one or more hidden states of the dynamic system,
wherein the retro-causal network describes an information flow proceeding backward in time between second state vectors of the dynamic system, wherein a second state vector at a respective point in time comprises one or more second entries which are each assigned to an entry of the observable vector, and one or more hidden states of the dynamic system,
determining the observable vector by respectively combining the first entries of the first state vector with the second entries of the second state vector for respective points of time before and after a current point of time,
wherein the causal network and the retro-causal network are learned based on training data which contains a sequence of consecutive known observable vectors.

2. The method as claimed in claim 1, wherein, during learning of the causal and retro-causal networks at a respective point in time, for which a known observable vector from the training data exists, the first and second entries of the first and second state vectors are corrected using the difference between the observable vector determined in the recurrent neural network and the known observable vector at the respective point in time, the first and second state vectors with the corrected first and second entries continuing to be used for learning.

3. The method as claimed in claim 1, wherein the causal network and the retro-causal network are learned based on error-back-propagation with shared weights.

4. The method as claimed in claim 1, wherein, in the recurrent neural network at a respective point in time, the observable vector is determined such that the respective first and second entries which are assigned to the same entry of the observable vector are added.

5. The method as claimed in claim 1, wherein, during learning of the causal and retro-causal networks at a respective point in time, for which a known observable vector from the training data exists, a target value is determined which represents the difference vector between the observable vector determined in the recurrent neural network and the known observable vector at the respective point in time, wherein the minimization of the sum of the absolute values or squared absolute values of the difference vectors at the respective points in time, for which a known observable vector from the training data exists, is predefined as the learning optimization target.

6. The method as claimed in claim 1, wherein in the causal network a first state vector at a respective point in time is converted into a first state vector at a subsequent point in time by multiplication by a matrix assigned to the causal network and the application of an activation function.

7. The method as claimed in claim 6, wherein first the activation function is applied to the first state vector at the respective point in time and then multiplication by the matrix assigned to the causal network is performed.

8. The method as claimed in claim 1, wherein in the retro-causal network a second state vector at a respective point in time is converted into a second state vector at a previous point in time by multiplication by a matrix assigned to the retro-causal network and the application of an activation function.

9. The method as claimed in claim 8, wherein first the activation function is applied to the second state vector at the respective point in time and then multiplication by the matrix assigned to the retro-causal network is performed.

10. The method as claimed in claim 6, wherein the activation function is a tan h function.

11. The method as claimed in claim 1, wherein the recurrent neural network is used to model energy price and/or commodity price changes over time.

12. The method as claimed in claim 1, wherein the recurrent neural network is used to model a technical system.

13. The method as claimed in claim 12, wherein the technical system is a gas turbine or a wind turbine.

14. A non-transitory computer readable medium comprising program code for carrying out a method when the program is executed on a computer, wherein the method is for computer-aided learning of a recurrent neural network for modeling a dynamic system which is characterized at respective times by an observable vector comprising one or more observables as entries, the method comprising:
using a recurrent neural network comprising a causal network, a retro-causal network, an observable vector with one or more observables,
wherein the causal network describes an information flow proceeding forward in time between first state vectors of the dynamic system, wherein a first state vector at a respective point in time comprises one or more first entries which are each assigned to an entry of the observable vector, and one or more hidden states of the dynamic system,
wherein the retro-causal network describes an information flow proceeding backward in time between second state vectors of the dynamic system, wherein a second state vector at a respective point in time comprises one or more second entries which are each assigned to an entry of the observable vector, and one or more hidden states of the dynamic system,
determining the observable vector by respectively combining the first entries of the first state vector with the second entries of the second state vector for respective points of time before and after a current point of time,
wherein the causal network and the retro-causal network are learned based on training data which contains a sequence of consecutive known observable vectors.

15. The method according to claim 1 wherein the provided recurrent neural network corresponds at least in part to the following:

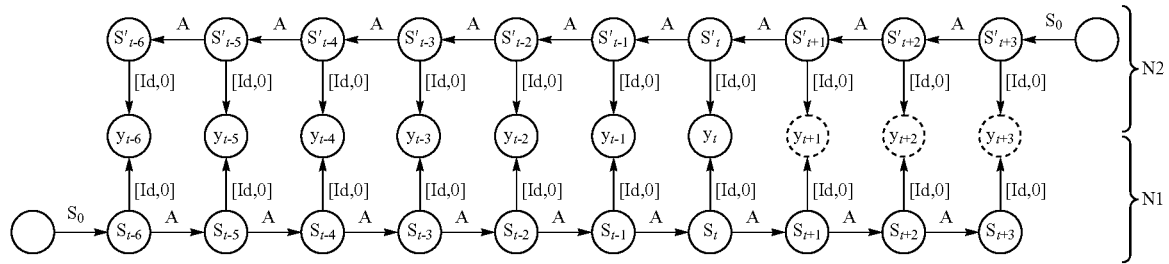

where:
  N1 corresponds to the causal network;
  N2 corresponds to the retro-causal network;
  t−6 to t+3 correspond to the respective points in time;
  $S_{t-6}$ to $S_{t+3}$ correspond to the first state vector entries at the respective points in time;
  $S'_{t-6}$ to $S'_{t+3}$ correspond to the second state vector entries at the respective points in time;
  $Y_{t-6}$ to $Y_{t+3}$ correspond to the observable vector entries at the respective points in time;
  $Y_{t-6}$ to $Y_t$ correspond to the consecutive known observable vector entries; and
  [Id,0] corresponds to a filtering matrix.

* * * * *